US009070046B2

(12) United States Patent
Geng et al.

(10) Patent No.: US 9,070,046 B2
(45) Date of Patent: Jun. 30, 2015

(54) LEARNING-BASED IMAGE WEBPAGE INDEX SELECTION

(71) Applicant: Microsoft Corporation, Redmond, WA (US)

(72) Inventors: Bo Geng, Beijing (CN); Xian-Sheng Hua, Sammamish, WA (US); Zhong Wu, Issaquah, WA (US); Dengyong Zhou, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 251 days.

(21) Appl. No.: 13/654,397

(22) Filed: Oct. 17, 2012

(65) Prior Publication Data
US 2014/0105488 A1    Apr. 17, 2014

(51) Int. Cl.
G06F 7/00  (2006.01)
G06K 9/62  (2006.01)
G06F 17/30  (2006.01)

(52) U.S. Cl.
CPC ........ G06K 9/6265 (2013.01); G06F 17/30864 (2013.01)

(58) Field of Classification Search
None
See application file for complete search history.

(56) References Cited

U.S. PATENT DOCUMENTS

| 5,793,888 | A | 8/1998 | Delanoy |
| 6,643,643 | B1 | 11/2003 | Lee et al. |
| 7,870,132 | B2 | 1/2011 | Chen et al. |
| 8,359,309 | B1 * | 1/2013 | Provine et al. ............... 707/721 |
| 8,515,212 | B1 * | 8/2013 | Bengio et al. ................ 382/305 |
| 2003/0135490 | A1 * | 7/2003 | Barrett et al. ..................... 707/3 |
| 2006/0074984 | A1 | 4/2006 | Milener et al. |
| 2009/0210369 | A1 * | 8/2009 | Shao et al. ....................... 706/21 |
| 2011/0161260 | A1 | 6/2011 | Burges et al. |
| 2011/0231390 | A1 * | 9/2011 | Inagaki et al. ............... 707/721 |
| 2011/0270828 | A1 | 11/2011 | Varma et al. |
| 2012/0166366 | A1 | 6/2012 | Zhou et al. |

OTHER PUBLICATIONS

Shen et al., "Mining Web Query Hierarchies from Clickthrough Data", In Proceedings of Association for the Advancement of Artificial Intelligence, Jul. 22, 2007, 6 pages.
Arguello et al., "Learning to Aggregate Vertical Results into Web Search Results", In Proceedings of 20th ACM Conference on Information and Knowledge Management, Oct. 24, 2011, 10 pages.
Jain et al., "Learning to Re-Rank: Query-Dependent Image Re-Ranking Using Click Data", In Proceedings of 20th International World Wide Web Conference, Mar. 28, 2011, 10 pages.

(Continued)

Primary Examiner — Robert Beausoliel, Jr.
Assistant Examiner — Hau H Hoang
(74) Attorney, Agent, or Firm — Dave Ream; Doug Barker; Micky Minhas

(57) ABSTRACT

Architecture that performs image page index selection. A learning-based framework learns a statistical model based on the hyperlink (URL-uniform resource locator) previous click information obtained from the image search users. The learned model can combine the features of a newly discovered URL to predict the possibility of the newly-discovered URL being clicked in the future image search. In addition to existing web index selection features, image clicks are added as features, and the image clicks are aggregated over different URL segments, as well as the site modeling pattern trees to reduce the sparse problem of the image click information.

20 Claims, 7 Drawing Sheets

(56) References Cited

OTHER PUBLICATIONS

Jing et al., "PageRank for Product Image Search", In Proceedings of 17th International World Wide Web Conference, Apr. 21, 2008, 9 pages.
S. Burklen, "User Centric Walk: An Integrated Approach for Modeling the Browsing Behavior of Users on the Web", In Proceedings of the 38th Annual Simulation Symposium, Apr. 4, 2005, 11 pages.
S. Brin et al., "The Anatomy of a Large-Scale Hypertextual Web Search Engine", In Proceedings of the Seventh International Wide Web Conference, Apr. 14, 1998, 20 pages, Brisbane, Australia, Elsevier.
Page et al., "The PageRank Citation Ranking: Bringing Order to the Web", In Technical Report of Stanford University, Jan. 29, 1998, 17 pages, Stanford, CA.
Jon M. Kleinberg, "Authoritative Sources in a Hyperlinked Environment", Journal of the ACM, Sep. 1999, vol. 46, Issue 5, 29 pages.
Najork et al., "Less is More: Sampling the Neighborhood Graph Makes SALSA Better and Faster", In 2nd ACM International Conference on Web Search and Data Mining, Feb. 2009, 10 pages.
Najork et al., "Efficient and Effective Link Analysis with Precomputed SALSA Maps" In Proceedings of the 17th ACM Conference on Information and Knowledge Management, Oct. 26, 2008, 9 pages.
Mark Najork et al., "Comparing the Effectiveness of HITS and SALSA", In Proceedings of the Sixteenth ACM Conference on Conference on Information and Knowledge Management, Nov. 6, 2007, 8 pages.
Najork et al., "HITS on the Web: How does it Compare?", In 30th Annual International ACM SIGIR Conference on Research and Development in Information Retrieval, Jul. 23, 2007, 8 pages.
Liu et al., "BrowseRank: Letting Users Vote for Page Importance", In Proceedings of the 31st Annual International ACM SIGIR Conference, Jul. 20, 2008, 8 pages.
"Multiple Additive Regression Trees", retrieved at: http://www-stat.stanford.edu/~jhf/R-MART.html, last accessed Aug. 28, 2012, 1 page.
Jerome H. Friedman, "Greedy Function Approximation: A Gradient Boosting Machine", Annals of Statistics, Feb. 24, 1999, 34 pages, vol. 29.
Mallat et al., "Matching Pursuits with Time Frequency Dictionaries", In IEEE Transactions on Signal Processing, Dec. 1993, 19 pages, vol. 41, Issue 12.
Schapire et al., "Improve Boosting Algorithms Using Confidence-Rated Predictions", In Proceedings of the Eleventh Annual Conference on Computational Learning Theory, Jul. 24, 1998, 40 pages.
Freund et al., "Experiments with a New Boosting Algorithm", In Proceedings of the Thirteenth International Conference of Machine Learning, Jul. 3, 1996, 9 pages.
Lei et al., "A Pattern Tree-based Approach to Learning URL Normalization Rules", In Proceedings of the 19th International Conference on World Wide Web, Apr. 26, 2010, 10 pages.

* cited by examiner

LEARNING-BASED IMAGE WEBPAGE INDEX SELECTION

BACKGROUND

The web is a vast source of multimedia content. With the increasing use of images on the web, building an image search engine that is capable of covering and returning the most informative images as well as the associated pages is desirable. Trillions of page hyperlinks (e.g., (URLs) uniform resource locators) can be discovered on the web, and each page may contain multiple images (e.g., more than ten). It is infeasible to index all of those pages for the image search, due to the limitations of the network bandwidth, data storage, and data processing at the offline stage, as well as the response time at the online serving stage.

Existing image page index selection is generally based on the webpage static rank, which measures how important a page is for the web search. However, as a vertical domain, the objective of the image search differs from the broad-based web search in indexing the pages, if and only if the pages contain interesting and informative images. In practice, this difference results in a huge amount of "good" image pages being omitted from the index, since the pages with high webpage static rank may not contain many good images while the pages with interesting images may not be recognized as sufficiently important. It is desirable to enable an image search engine that is capable of covering and returning the most informative images as well as the associated pages.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture performs image page index selection customized for the image search vertical (a specialized search service such as "buy" for a shopping vertical, "news" for a news vertical, "pics" for an image vertical, etc.). A learning-based framework learns a statistical model based on the hyperlink (URL-uniform resource locator) previous click information obtained from the image search users. The learned model can combine the features of a newly discovered URL to predict the possibility of the newly-discovered URL being clicked in the future image search. In addition to existing web index selection features, image clicks are added as features, and the image clicks are aggregated over different URL segments, as well as the site modeling pattern trees to reduce the sparse problem of the image click information.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
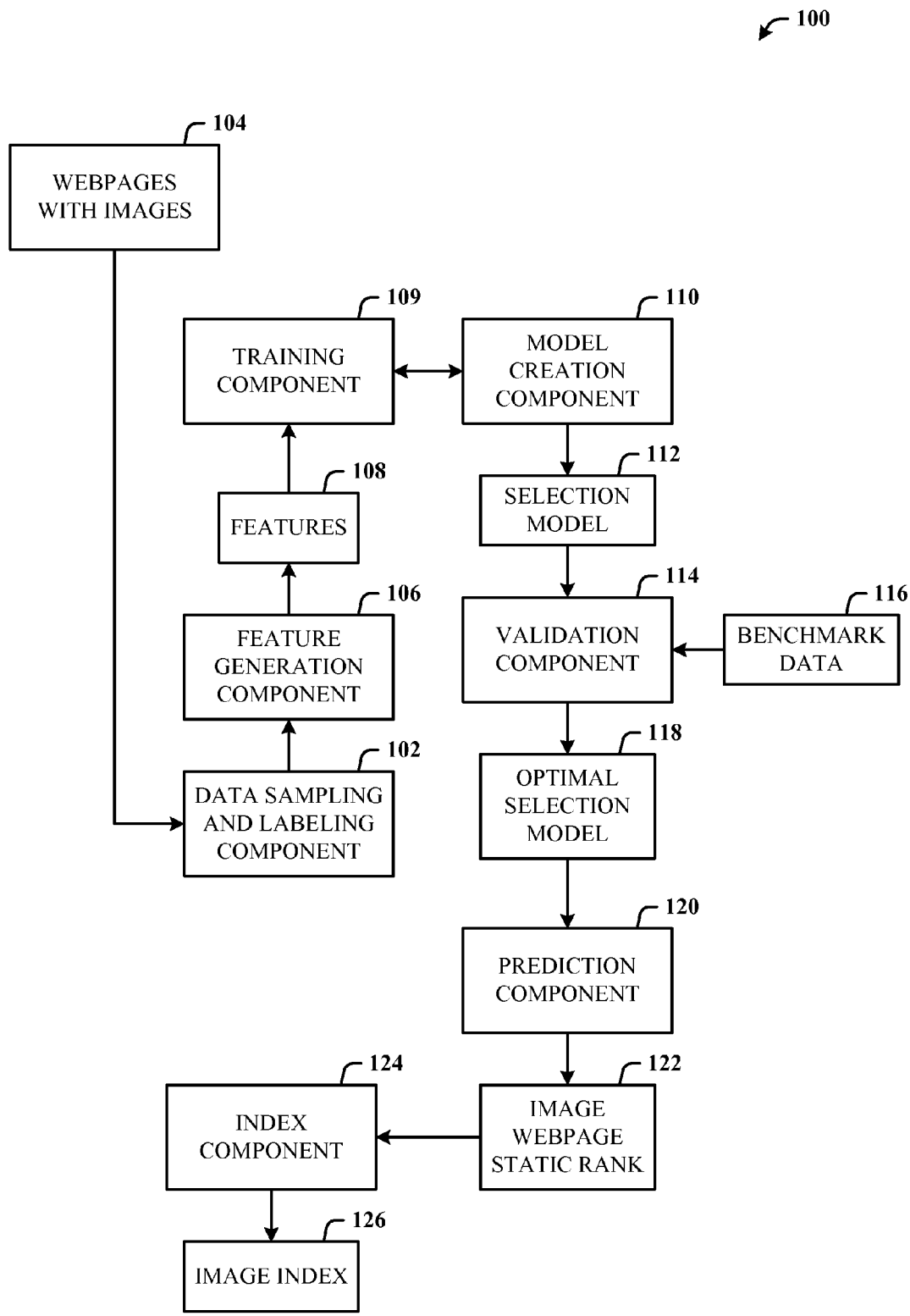
FIG. 1 illustrates a system in accordance with the disclosed architecture.

Web search is a broad based search that targets on all the vertical domains, such as query-answer, social networks, video, news, shopping, image, music, etc. A "good" webpage (useful as a result relative to the received query) that is important for the web search may not contain good images. On the other hand, for image search, which is specialized to a vertical domain, a "good" image page may not be recognized as sufficiently important to be indexed for the web search. For example, two of the current most famous photo sharing websites are not included in the top ten hosts clicked (selected) by users based on a search merge log. Therefore, compared to the direct utilization of webpage static rank, it is desired to have image page static rank specialized for image page index selection.

The disclosed architecture enables an image search engine that is capable of covering and returning the most informative images as well as the associated pages. To estimate the image page static rank, the user interests to an image page are correlated to the clicks of this image in the image search results, since clicks are mostly generated when users have browsed the image thumbnail, and can reflect the user interests to view more details of the original image or its associated page. A learning-based framework is employed to build a statistical model based on gradient tree boosting, which can estimate the probability of a page being clicked in the image search results by combining a series of features extracted from the page URL (uniform resource locator).

The features for each page URL are utilized from various perspectives to reflect the importance of the page URL for the image search, including link-based features, click features, URL pattern features, and page property features. A site modeling feature can also be utilized to improve the accuracy of the selection model.

In one search engine implementation, the images that are sourced are only from the indexed webpages. However, it is unnecessary to index each discovered page, because many of the pages contain none or a significantly lesser number of images in which the users are interested. Therefore, the page index selection for the image search (also referred to as image page index selection) is desirable for a practical image search engine.

The disclosed image page index selection architecture employs an existing web index selection framework, which is a learning-based approach that predicts user interests to searching a web page. The user interests are implicitly reflected by the user clicks when using the search engines (e.g., the URLs clicked are likely more interesting to users than those URLs not clicked), since the user click indicates the desire to watch the details of the page, given the caption or thumbnail shown in the search results.

Based on the user clicks, the image page index selection is implemented by the following: (1) sampling the positive and negative training data from the discovered URLs based on user clicks; (2) extracting features for the sampled data, including URL patterns, link-based features, click features, and the page property features; (3) learning a selection model based on the sampled data; (4) validating the model settings over benchmark data; and, (5) applying the best performing model to predict the image page static rank of all the discovered URLs. Based on the image page static rank, the top ranked pages can be selected as the index targets.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include a data sampling and labeling component 102 that samples a subset of all webpages with images 104, and then labels the sampled webpages as positive webpage samples or negative webpage samples based on the image clicks. A feature generation component 106 generates features 108 from the labeled webpages. The features 108 are then employed by a training component 109 for model creation by a model creation component 110. The model creation component 110 creates a selection model 112 based on the sampled training webpages and the features 108. A validation component 114 evaluates and validates the selection model 112 using benchmark data 116 to obtain an optimal selection model 118. A prediction component 120 predicts an image webpage static rank 122 for a webpage based on the optimal selection model 118.

The system can further comprise an index component 124 that selects top ranked webpages as index targets (candidates for an image index) based on the image webpage rank. These targets can then be made part of an image index 126 that can be stored separate from or merged into the general webpage index. The features 108 are extracted in association with a webpage URL (uniform resource locator), and the features 108 can include link-based features, click features, URL pattern features, and/or webpage property features, to name only a few. The data sampling and labeling component 102 samples the training webpages within a specified time window and past clicks are used as features to train the selection model 112 to predict a selection score for future discovered URLs. The data sampling and labeling component 102 employs image clicks as labeling criteria to create the positive webpage samples and negative webpage samples as the training data.

The feature generation component 106 employs image clicks from one or more of a browser log, toolbar log, and a search engine log as features for image page index selection. The feature generation component 106 utilizes image click aggregation over different URL levels as part of the features 108. The feature generation component 106 utilizes image click aggregation over a website host to model URL patterns for the host, where the URL patterns used as part of the features 108.

Following is a more detailed description of the time periods of the image page index selection architecture.

Figure 2:
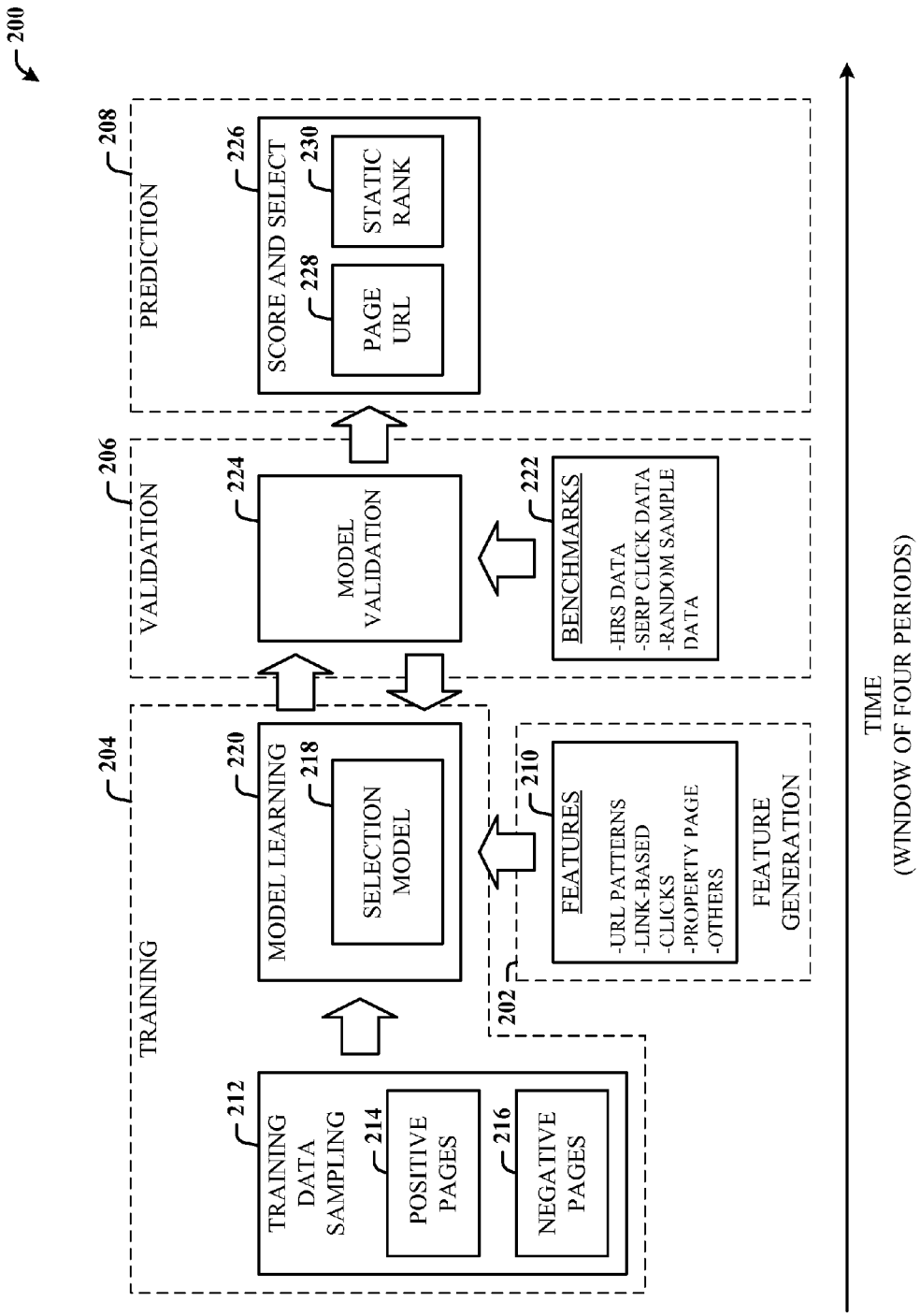
FIG. 2 illustrates a flow diagram of window time periods associated with learning-based image page index selection.

FIG. 2 illustrates a flow diagram 200 of window time periods associated with learning-based image page index selection. Specifically, in this example embodiment, the time window for training data sampling is split into four time periods: feature generation 202, training 204, validation 206, and prediction 208.

During feature generation 202, historical features 210 (as part of the features 108) of each webpage (sampled from the webpages with images 104) are accumulated and merged to a specific time, by which each training page is represented by the features 210 (similar to the features 108) at that time.

The features 210 can be categorized into five groups: URL patterns, link-based features, click features, page property features, and other URL features. The URL patterns are derived from the textual content that comprises the URLs, such as the URL length, the number of query parameters, and the host depth. The link-based features are based on the hyperlink-based relationships among different pages, such as page rank, in-link count, and link depth. In addition, click features are extracted based on the user behavior when using the search engines and/or browsing the web (e.g., the click count in search engine logs, the unique user browsing count in toolbar logs, etc.). The page property features are page characteristics analyzed by some document content-understanding models, including the spam confidence, junk page confidence, and directory confidence.

After the feature generation 202 (via the feature generation component 106), training data sampling 212 is performed (via the training component 102). The training data (positive and negative training pages) are sampled according to the clicks generated within a specified time (e.g., within several days), during which a predetermined number (e.g., one million) of clicked pages are sampled as positive webpage samples 214 and a predetermined number (e.g., one million) of non-clicked pages are sampled as negative webpage samples 216.

The training data (positive webpage samples 214 and negative webpage samples 216) is sampled based on the user's previous image search vertical clicks in the search engine log, since the prediction is the likelihood of a user's future clicks to an image inside some webpage. However, since the feature(s) for each webpage may change with time, such as click features, the data is sampled according to the clicks within specific time periods (windows) so that the past clicks can be used as features (e.g., features 210) to train a selection model 218 (via the model creation component 110) as part of model learning 220, which selection model 218 (similar to selection model 112) can be used as part of prediction 208 to predict a selection score for URLs discovered in the future.

In one example embodiment of model learning 220 (as part of training 204), multiple additive regression trees (MART) can be utilized to learn the selection model 218. MART is an implementation of the gradient tree boosting methods. The numerical optimization is performed in the function space, where a stage-wise strategy is adopted to update and readjust the previously entered functions by adding new functions in a steepest-descent manner. Such an additive optimization technique, which leads to the gradient boost procedure, is also commonly referred to as "matching pursuit" in signal processing and "boosting" in machine learning. Based on the general gradient boost, a J-terminal node regression tree can be adopted as the additive weak learner for each iteration update, which is the basic idea of the MART algorithm. MART produces competitive, highly robust, interpretable procedures for regression and classification, and is especially appropriate for mining less than clean data.

With respect to validation 206 (via validation component 114), which follows training 204, benchmark data 222 is collected to test the selection model 218 as part of model validation 224, and select the optimal performing selection model 118. The benchmark data 222 includes HRS (human relevance system) data (which is provided by a human to judge webpages), SERP (search engine results page) click data, and random sample data, for example. Model validation 224 (as part of validation 206) includes validation based on model parameters, feature settings, sampling strategies, label sources, time window, etc. To obtain the optimal selection model 118, the model parameters are validated (based on the measurement over some or all of the benchmark data 222).

A first approach is based on a metric InRankFileNDCG, which measures the perfect ranking performance of some HRS data collected from preselected existing search engines, and penalizes the value if the selection model missed to select a relevant image webpage in HRS data. InRankFileNDCG can be defined as follows: for each query q, first, sort its returned images according to a DCG (discounted cumulative gain) value, which is a comprehensive definition of image relevance given human's judgment, including image relevance, webpage relevance, and image quality. Based on this data, define, $$InRankFileNDCG@K = \frac{1}{|Q|} \sum_{q=1}^{|Q|} \frac{\sum_{i=1}^{K} I_{s_i \geq s_c} \cdot DCG_i^q}{\sum_{i=1}^{K} DCG_i^q},$$

where $DCG_i^q$ is the DCG of the i-th image for query q; $I_{s_i \geq s_c}$, and is: one, if the score of the i-th image is greater or equal to the cutoff score $s_c$; and zero, otherwise. The DCG indicates whether or not the i-th image is selected by the selection algorithm, given a pre-specified cutoff score $s_c$. The numerator is a normalizer that ensures the domain of InRankFileNDCG as [0, 1]. Based on InRankFileNDCG, the optimum model parameter(s), feature settings, sampling strategies, labeling strategies, etc., can be validated by selecting the model with the optimum InRankFileNDCG over the HRS data.

Normalized perceived index comprehensiveness (NPC) is another metric that can be employed, separately or in addition to the InRankFileNDCG metric, to validate the model performance. Firstly, collect the URLs based on clicked URLs of first (F) and a second (S) search engines, according to the browser application and toolbar browsing logs. Then, the clicked URLs of the first search engine are used to crawl the second search engine, and then test whether these URLs exist in second search engine. This can then be employed in the reverse, to use the clicked URLs of the second search engine to crawl the first search engine, and then test whether these URLs exist in first search engine. The final NPC is computed as:

$$NPC = \frac{P(S \mid FClick)}{P(F \mid SClick)},$$

where P(S|FClick) denotes the probability of the first search engines clicked URL existing in the second search engine, and P (F|SClick) denotes the probability of the second search engines clicked URL existing in the first search engine.

NPC measures the end-to-end selection performance by evaluating the index over the second set and comparing with the index of the first search engine. Using NPC, the model performance is validated and the model selection performed based on InRankFileNDCG.

The prediction 208 (via the prediction component 120) is the time period when the selection model 218 is placed into production (operation) for scoring and selection 226. Model prediction 208 applies the learned and validated (optimal) model to each discovered webpage URL 228 to compute its selection score. Based on the selection score of all webpage URLs, the webpage URLs are ranked and a specific number of the top ranked webpage URLs are selected as the indexing targets (candidates). This predicts the image webpage static rank 230 for every discovered webpage URL 228 based on the features extracted on that day. As an example, the features can be generated on July 31, and then the training data sampled based on clicks from August 1-15, followed by the evaluation on the benchmark data collected after August 15.

With respect to the functionalities of image signals, directly applying existing web index selection features and labels to train an image webpage index selection model may not effectively select the index that meets the information needs of image search engine users, since the objective of web index selection and that of image index selection are not coincident. Thus, the image vertical signals (e.g., log counts) are utilized to train a model that complies with the interests of image search engine users.

Although image vertical signals may be rich (e.g., image URL patterns, image locations and structures inside the webpage, image content information, etc.), few can be obtained before the webpage is downloaded. Therefore, for the image webpage index selection purposes, in one implementation, only image vertical search engine clicks are considered, which are utilized from the following four perspectives: image clicks as the label criteria, as URL features, for aggregation over the URL segments (URL-level features), and for aggregation over the site models.

With respect to image clicks as the label criteria, an objective for image webpage index selection is to predict the possibility of whether a webpage contains good images that users will search in the image search engine, rather than whether a webpage is interesting for web search users. Since the objectives are different, the click in image vertical search is used to determine which URLs are positive or negative, rather than using the web search clicks that were used for web index selection.

By changing the labeling criteria, the learned model closer reflects the user interests for image webpages by mining the patterns in the features correlated with the image search clicks. The detailed strategies are: in the training time, if the first search engine image click in the frontend search engine log or the second search engine image click in the browser or toolbar log is greater than zero for a URL, the URL is treated as a positive webpage URL. If the first search engine image click in the frontend search engine log and the second search engine image click in the browser as well as the toolbar log are all zero for a URL, the URL is treated as a negative webpage URL. By changing only the objective, the learned model significantly favors image webpages in terms of InRankFileNDCG, thereby indicating the importance of changing the label strategy from web click to image click.

With respect to image click as the URL feature, in addition to existing webpage index selection features, the image vertical clicks from the browser, toolbar, and frontend search engine logs are also included as features for the image webpage index selection. Since the image click is an objective of the selection model 218, the past image click count over some URLs can provide a signal that indicates their associated future clicks in the image vertical. However, since the click counts may be accumulated every day, this may cause the scale of the feature to vary from time to time, and thus, affect the selection model performance.

A heuristic weight decay schema is performed to accumulate the image clicks. Given the current computation date as the click accumulation date, the weight of a previous click can be computed based on the following formula:

$$w = c_x * 2^{-x/y},$$

where $c_x$ denotes the click count of the URL occurred x days ago; y is the half-time weight decay, with a larger value for y indicating a slower decay on the weight and a smaller value for y indicating a faster decay on the weight. With this decay strategy, the image click accumulates to a stable value due to the property of geometric progression. In one implementation, the half-time decay settings are one, four, eight, and sixteen days as four independent features, and the learning approach is utilized to determine which half-time decay setting is more appropriate to train the selection model 218.

With respect to image click aggregation over the URL segments, individual URL-level image clicks are sparse, and thus, typically, only a small number of URLs are clicked. To address this, the image clicks are also aggregated over different URL segments.

Figure 3:
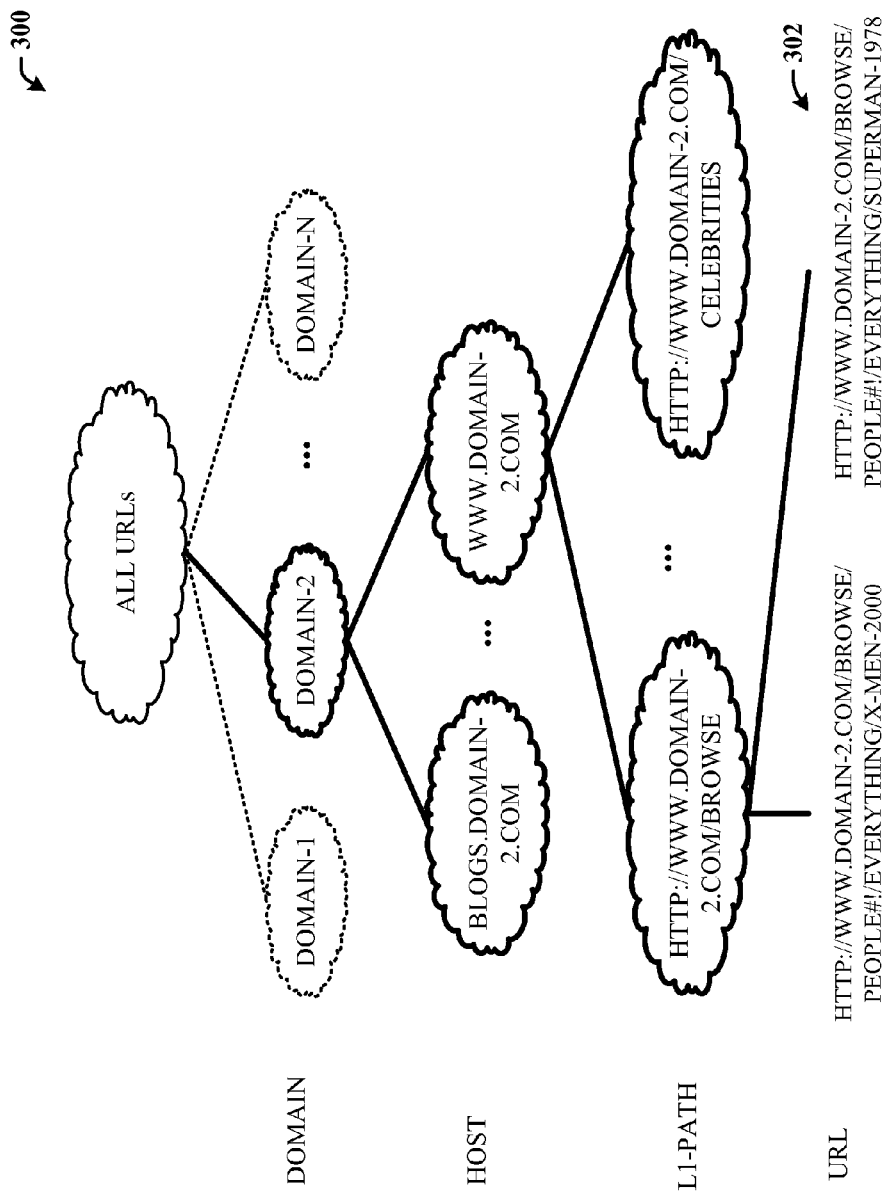
FIG. 3 illustrates a diagram of URL segment-based click propagation.

FIG. 3 illustrates a diagram 300 of URL segment-based click propagation. Here, each URL is segmented to four parts: Domain, Host, L1-Path, and URL suffix. The clicks for the URLs are aggregated under the same Domain, Host, and L1-Path, using both the summation and average functions described above. If one of the URLs 302 is clicked, the click signal is propagated upward to the URLs under the same L1-Path, Host, and Domain, respectively (as denoted by entities with the bolded lines).

The clicks aggregated at different levels are taken as different features. For example, for the summation aggregation of URL clicks with the same host, each URL under the host is extracted with the feature that is equal to the summation of the click over all the URLs under the host.

Figure 4:
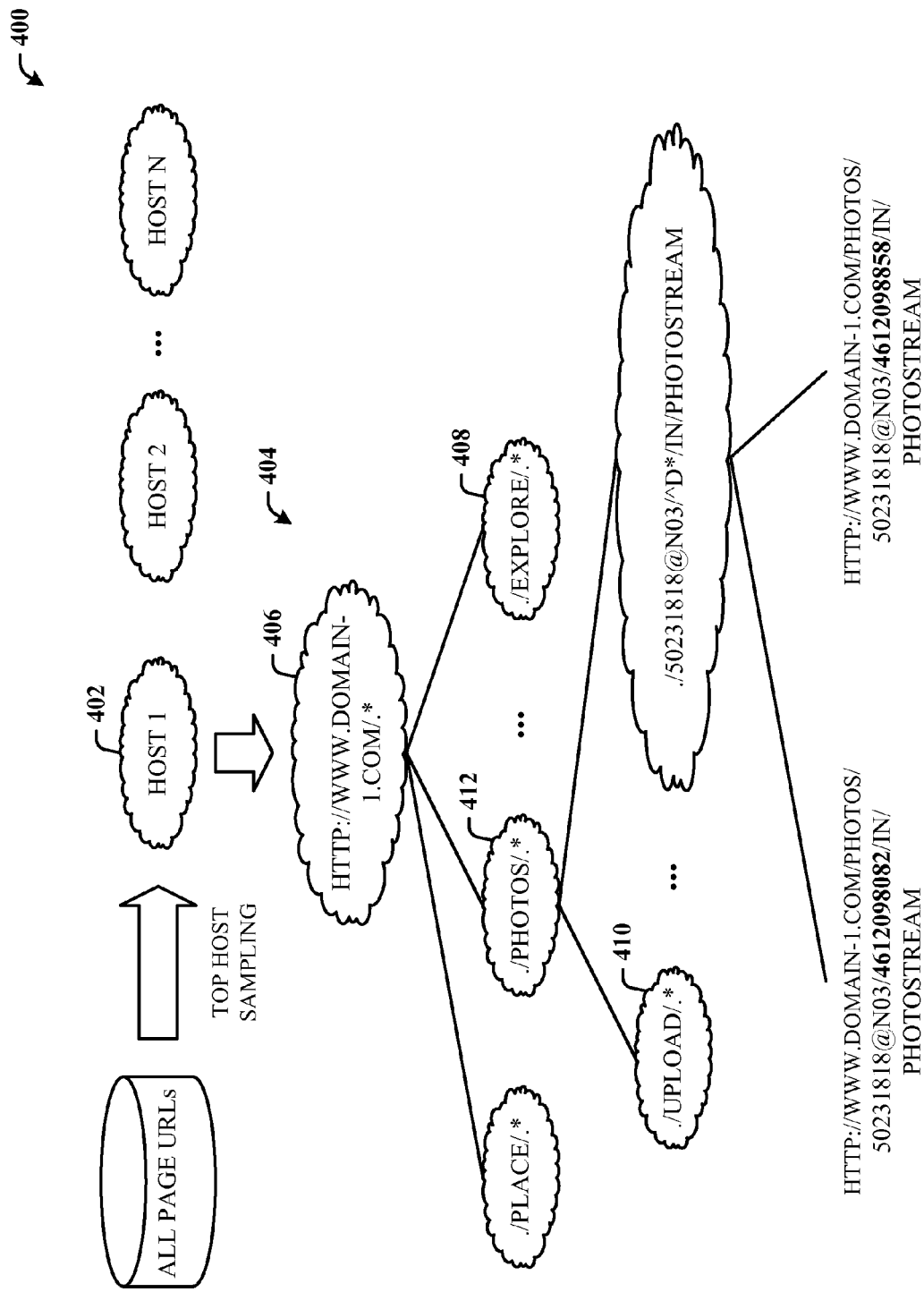
FIG. 4 illustrates a diagram of site modeling-based click propagation.

FIG. 4 illustrates a diagram 400 of site modeling-based click propagation. With respect to image click aggregation over the site models, in addition to URL segment-based click aggregation described above, URLs can also be sampled for top hosts (e.g., a host 402), and a site modeling tree structure 404 is built to model the URL patterns for a specific host (the host 402). The URLs of each host are summarized into regular expression-based patterns. The regular expressions of the tree structure 404 are automatically mined from the sampled URLs to summarize all the URLs under the same host in a top-down manner. The clicks are propagated among these pattern nodes hierarchically with weighted decay.

A root node 406 in the tree structure 404 contains all the sampled URLs in a host (e.g., host 402). Each intermediate node (e.g., node 408, node 410) uses a regular expression to cover a subset of URLs. The URLs in two sibling nodes (e.g., node 408 and node 412) are exclusive (the URL of one node will not be in its sibling nodes).

Over the tree structure 404, the image clicks are aggregated hierarchically from the bottom to the tree root node 406. For each node (e.g., node 408, node 410), the node score is calculated by the average clicks of all the URLs that satisfy the patterns of the node. Given a new arbitrary URL, the algorithm first attempts to match the leaf node in the pattern tree structure 404, and then hierarchically sums the score from the leaf node back to the root node 406 with a weighted decay. The final summed score is taken as a new feature to represent the probability of a URL being clicked based according to its URL patterns inside the host 402.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
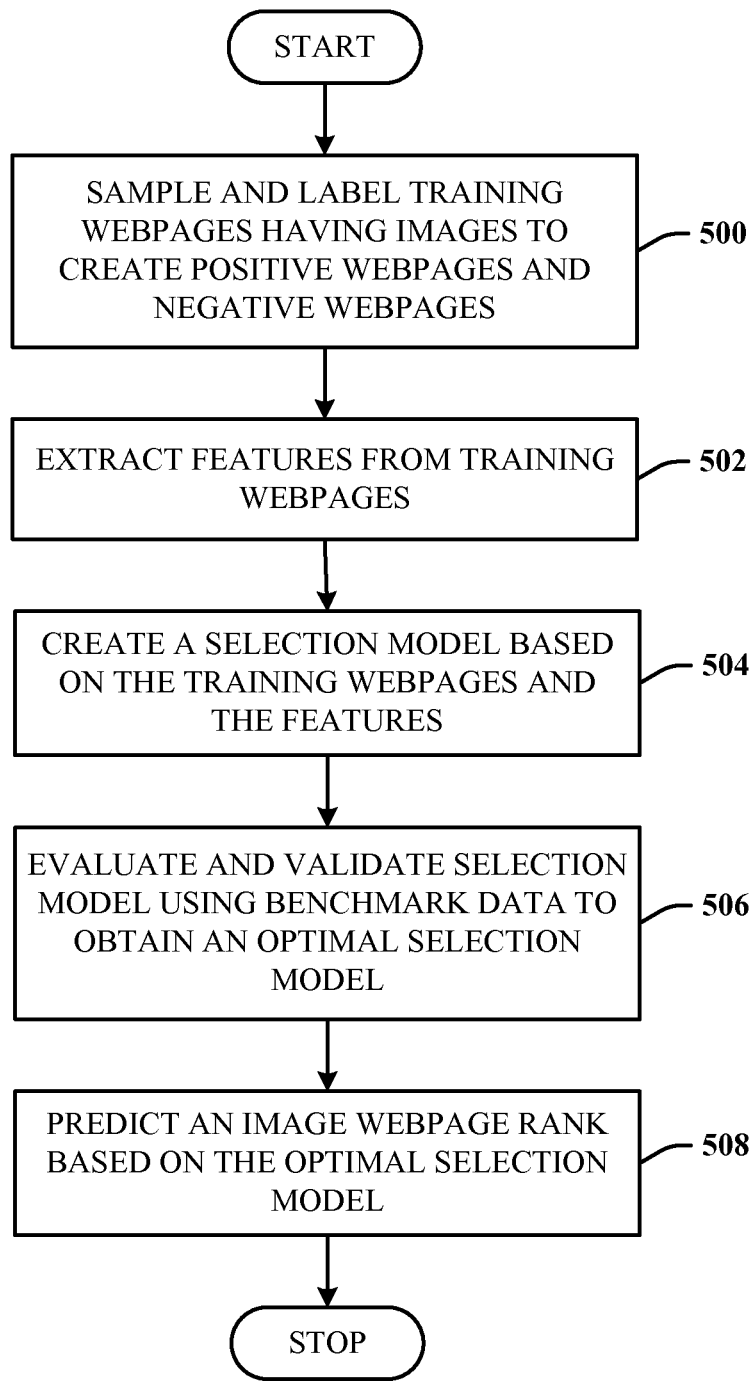
FIG. 5 illustrates a method in accordance with the disclosed architecture.

FIG. 5 illustrates a method in accordance with the disclosed architecture. The method can be performed by a computer system executing machine-readable instructions. At 500, training webpages having images are sampled and labeled to create positive webpages and negative webpages. At 502, features are extracted from the training webpages. At 504, a selection model is created based on the training webpages and the features. At 506, the selection model is evaluated and validated using benchmark data to obtain an optimal selection model. At 508, an image webpage rank is predicted based on the optimal selection model.

The method can further comprise creating an image index based on the predicted image page rank. The method can further comprise accumulating and merging the features according to a specific time, and representing each training webpage by the features at that specific time. The method can further comprise learning the selection model based on URL click information of image search users.

The method can further comprise creating the positive webpage and negative webpage sampling data based on a user click of an image of a vertical image search. The method can further comprise applying weight decay to each image click to accumulate the image clicks. The method can further comprise employing an image click as a labeling criterion and an image click as a URL feature. The method can further comprise employing image click aggregation over URL segments, and image click aggregation over website hosts to model URL patterns.

Figure 6:
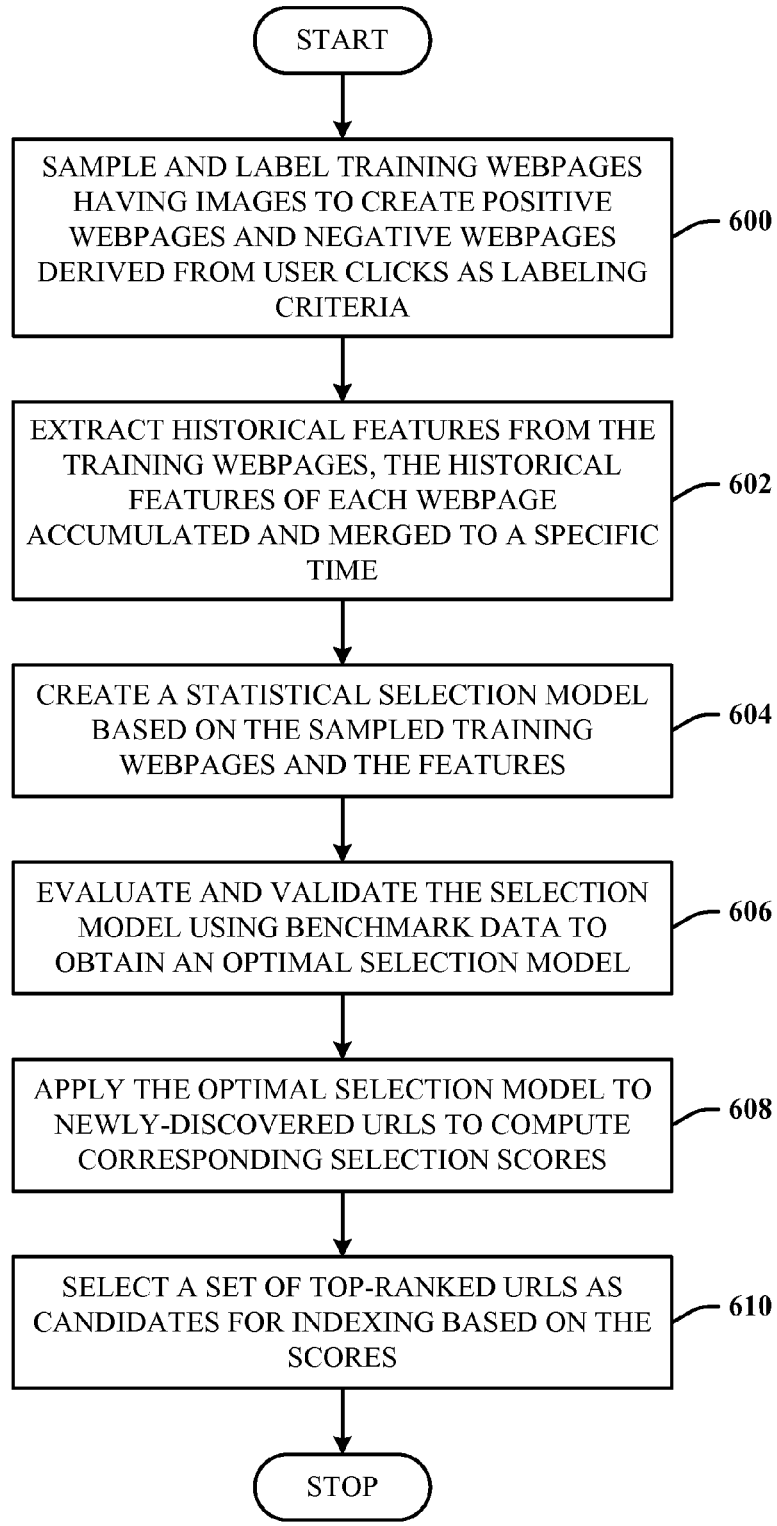
FIG. 6 illustrates an alternative method in accordance with the disclosed architecture.

FIG. 6 illustrates an alternative method in accordance with the disclosed architecture. The alternative method includes a computer-readable medium that comprises instructions which when executed by a processor cause the processor to perform the following acts. At 600, training webpages having images are sampled and labeled to create positive webpages and negative webpages derived from user clicks as labeling criteria. At 602, historical features are extracted from the training webpages. The historical features of each webpage are accumulated and merged to a specific time. At 604, a statistical selection model is created based on the sampled training webpages and the features. At 606, the selection model is evaluated and validated using benchmark data to obtain an optimal selection model. At 608, the optimal selection model is applied to newly-discovered URLs to compute corresponding selection scores. At 610, a set of top-ranked URLs is selected as candidates for indexing based on the scores.

The method can further comprise an act of modeling a web host site as a tree structure that represents URL patterns of the host site. The method can further comprise an act of aggregating image clicks over URL segments that include domain, host, L1-path and suffix, the image clicks of the different segments are utilized as different features. The method can further comprise an act of utilizing image clicks from at least one of a browser log, toolbar log, or a search engine log as features for image page index selection, in addition to webpage index selection features.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
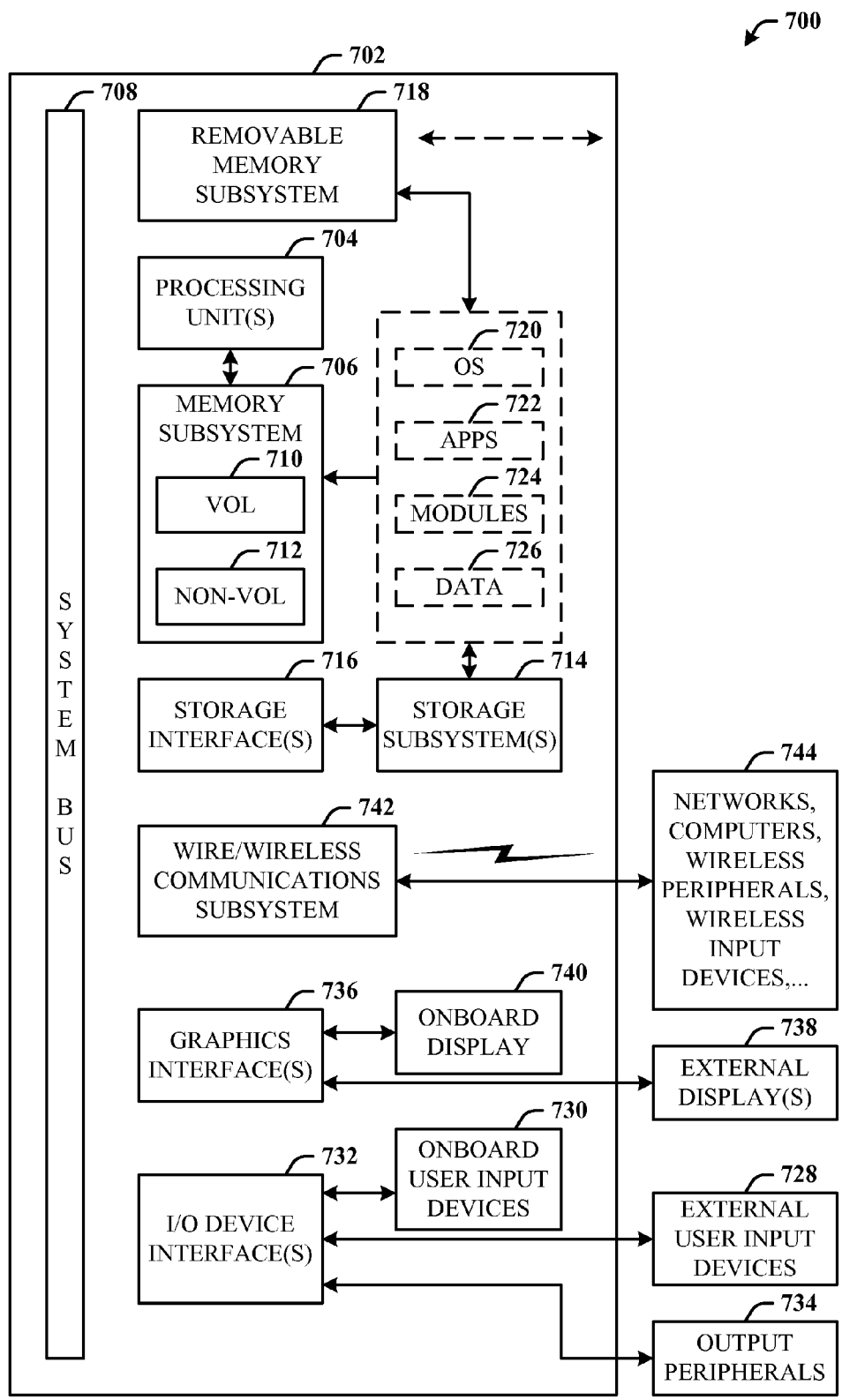
FIG. 7 illustrates a block diagram of a computing system that executes learning-based image page index selection in accordance with the disclosed architecture.

Referring now to FIG. 7, there is illustrated a block diagram of a computing system 700 that executes learning-based image page index selection in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704 (also referred to as microprocessor(s) and processor(s)), a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 702 can be one of several computers employed in a datacenter and/or computing resources (hardware and/or software) in support of cloud computing services for portable and/or mobile computing systems such as cellular telephones and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), solid state drive (SSD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include entities and components of the system 100 of FIG. 1, entities and components of the flow diagram 200 of FIG. 2, entities and flow of the diagram 300 of FIG. 3, entities and flow of the diagram 400 of FIG. 4, and the methods represented by the flowcharts of FIGS. 5 and 6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that does not employ propagated signals, can be accessed by the computer 702, and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse, as well as by voice commands facilitated by speech recognition. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example.

These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a data sampling and labeling component configured to sample training webpages having images to create positive webpage samples and negative webpage samples based on user image clicks;
a feature generation component configured to employ the user image clicks to extract features from the training webpages;
a model creation component configured to create a selection model for an image webpage index based on the sampled training webpages and the features, wherein the data sampling and labeling component is configured to sample the training webpages within a specified time window, and past user image clicks are used as features to train the selection model;
a validation component configured to evaluate and validate the selection model for the image webpage index using benchmark data to obtain an optimal selection model;
a prediction component configured to predict an image webpage static rank of newly-discovered image webpages based on the optimal selection model; and
a microprocessor that executes computer-executable instructions associated with the data sampling and labeling component, feature generation component, model creation component, validation component, and prediction component.

2. The system of claim 1, further comprising an index component configured to select top ranked newly-discovered image webpages as index targets based on the image webpage static rank.

3. The system of claim 1, wherein the features are extracted in association with a webpage URL (uniform resource locator), the features include at least one of link-based features, click features, URL pattern features, or webpage property features.

4. The system of claim 1, wherein the data sampling and labeling component is configured to sample the training webpages within the specified time window and the past user image clicks are used as features to train the selection model to predict a selection score for future discovered image webpages.

5. The system of claim 1, wherein the data sampling and labeling component is configured to employ user image clicks as labeling criteria to create the positive webpage samples and negative webpage samples.

6. The system of claim 1, wherein the feature generation component is configured to employ user image clicks from at least one of a browser log, toolbar log, or a search engine log as features for image webpage index selection.

7. The system of claim 1, wherein the feature generation component is configured to utilize user image click aggregation over different URL levels as features.

8. The system of claim 1, wherein the feature generation component is configured to utilize user image click aggregation over a website host to model URL patterns for the host, the URL patterns used as features.

9. A method, performed by a computer system executing machine-readable instructions, the method comprising acts of:
sampling and labeling webpages having images as training webpages to create positive webpages and negative webpages based on a user click of an image, the sampling performed within a specified time window;
employing the user image clicks to extract features from the training webpages;
creating a selection model for an image index based on the training webpages and the features;
training the selection model using at least past user image clicks as features;
evaluating and validating the selection model using benchmark data to obtain an optimal selection model;
applying the optimal selection model to predict an image webpage static rank of newly-discovered image webpages, such that top ranked newly-discovered image webpages can be selected as targets for the image index based on the image webpage static rank; and
configuring at least one microprocessor to execute instructions to perform the acts of sampling, employing, creating, training, evaluating, and applying.

10. The method of claim 9, further comprising creating the image index based on the predicted image webpage static rank.

11. The method of claim 9, further comprising accumulating and merging the features according to a specific time, and representing each training webpage by the features at that specific time.

12. The method of claim 9, further comprising learning the selection model based on user image click information of image search users.

13. The method of claim 9, further comprising creating the positive webpage and negative webpage sampling data based on a user click of an image of a vertical image search.

14. The method of claim 9, further comprising applying weight decay to each user image click to accumulate the user image clicks.

15. The method of claim 9, further comprising employing a user image click as a labeling criterion and a user image click as a URL feature.

16. The method of claim 9, further comprising employing user image click aggregation over URL segments, and user image click aggregation over website hosts to model URL patterns.

17. A method, performed by a computer system executing machine-readable instructions, the method comprising acts of:
sampling and labeling training webpages having images to create positive webpages and negative webpages derived from user image clicks as labeling criteria the sampling performed within a specified time window;
extracting historical features from the user image clicks on the training webpages, the historical features of each training webpage accumulated and merged to a specific time;
creating a statistical selection model based on the sampled training webpages and the features;
training the selection model using at least past user image clicks as features;
evaluating and validating the selection model using benchmark data to obtain an optimal selection model;
applying the optimal selection model to newly-discovered image webpages to compute corresponding selection scores of the newly-discovered image webpages; and
selecting a set of top-ranked newly-discovered image webpages as candidates for indexing based on the scores.

18. The method of claim 17, further comprising an act of modeling a web host site as a tree structure that represents URL patterns of the host site.

19. The method of claim 17, further comprising an act of aggregating user image clicks over URL segments that include domain, host, L1-path and suffix, the user image clicks of the different segments are utilized as different features.

20. The method of claim 17, further comprising an act of utilizing user image clicks from at least one of a browser log, toolbar log, or a search engine log as features for image webpage index selection, in addition to image webpage index selection features.

* * * * *